United States Patent
Fujimoto et al.

(10) Patent No.: US 11,600,838 B2
(45) Date of Patent: Mar. 7, 2023

(54) ION-SELECTIVE MEMBRANE FOR REDOX FLOW BATTERIES

(71) Applicant: National Technology & Engineering Solutions of Sandia, LLC, Albuquerque, NM (US)

(72) Inventors: Cy Fujimoto, Albuquerque, NM (US); Ehren Baca, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 0 days.

(21) Appl. No.: 17/391,508

(22) Filed: Aug. 2, 2021

(65) Prior Publication Data

US 2022/0059861 A1 Feb. 24, 2022

Related U.S. Application Data

(60) Provisional application No. 63/067,989, filed on Aug. 20, 2020.

(51) Int. Cl.
*H01M 8/20* (2006.01)
*H01M 8/1004* (2016.01)

(52) U.S. Cl.
CPC .......... *H01M 8/20* (2013.01); *H01M 8/1004* (2013.01); *H01M 2300/0005* (2013.01)

(58) Field of Classification Search
CPC .................. H01M 8/20; H01M 8/1004; H01M 2300/0005
See application file for complete search history.

(56) References Cited

U.S. PATENT DOCUMENTS 9,580,541 B1 * 2/2017 Fujimoto ............... C08G 61/10

OTHER PUBLICATIONS

Li, N. and Guiver, M.D., "Ion Transport by Nanochannels in Ion-Containing Aromatic Copolymers," Macromolecules, 2014, vol. 47, pp. 2175-2198.
Gindt, B.P. et al., "Effects of Sulfonated Side Chains Used in Polysulfone Based PEMs for VRFB Separator," Journal of Membrane Science, 2017, vol. 532, pp. 58-67.
Zhang, X. et al., "Polymer Electrolyte Membranes Based on Poly(Phenylene Ether)s with Sulfonic Acid via long Alkyl Side Chains," Journal Materials Chemistry A, 2013, vol. 1, pp. 11389-11396.

(Continued)

*Primary Examiner* — Alexander Usyatinsky
(74) *Attorney, Agent, or Firm* — Kevin W. Bieg

(57) ABSTRACT

A fluoro sulfonated poly(phenylene) was rationally designed with an external hydrophobic shell and internal hydrophilic core in order to improve the durability and ion selectivity of a hydrocarbon membrane for vanadium redox flow batteries (VRFBs). The polymer was designed to prevent hydrophilic polymer chain aggregation by attaching acid moieties onto the polymer backbone, while functionalizing the external polymer shell with hydrophobic side chains to prevent excessive vanadium crossover associated with cation exchange membranes. As an example, the hydrophobic shell can be provided by pentafluorobenzoyl group functionalization of the pendent aryl groups on a Diels Alder poly (phenylene) backbone, while the internal polymer chain can contain sulfonic acid moieties to impart hydrophilic character.

2 Claims, 10 Drawing Sheets

(56) References Cited

OTHER PUBLICATIONS

Kobayashi, T. et al., "Proton-Conducting Polymers Derived from Poly(ether-etherketone) and Poly(4-phenoxybenzoyl-1,4-phenylene)," Solid State Ionics, 1998, vol. 106, pp. 219-225.

Fujimoto, C. et al., Vanadium Redox Flow Battery Efficiency and Durability Studies of Sulfonated Diels Alder Poly(phenylene)s, Electrochemistry Communications, 2012, vol. 20, vol. 48-51.

Sun, C-N et al., "Evaluation of Diels-Alder Poly(phenylene) Anion Exchange Membranes in All-Vanadium Redox Flow Batteries," Electrochemistry Communications, 2014, vol. 43, pp. 63-66.

Holmes, T. et al., "Stability of Hydrocarbon Fuel Cell Membranes: Reaction of Hydroxyl Radicals with Sulfonated Phenylated Polyphenylenes," Chemistry of Materials, 2019, vol. 31, pp. 1441-1449.

Fujimoto, C. et al., "Acid-Catalyzed Benzoylation Reactions of Diels-Alder Polyphenylenes," Polymer, 2018, vol. 158, pp. 190-197.

Liu, B. et al., Aromatic Poly(ether ketone)s with Pendant Sulfonic Acid Phenyl Groups Prepared by a Mild Sulfonation Method for Proton Exchange Membranes, Macromolecules, 2007, vol. 40, pp. 1934-1944.

\* cited by examiner

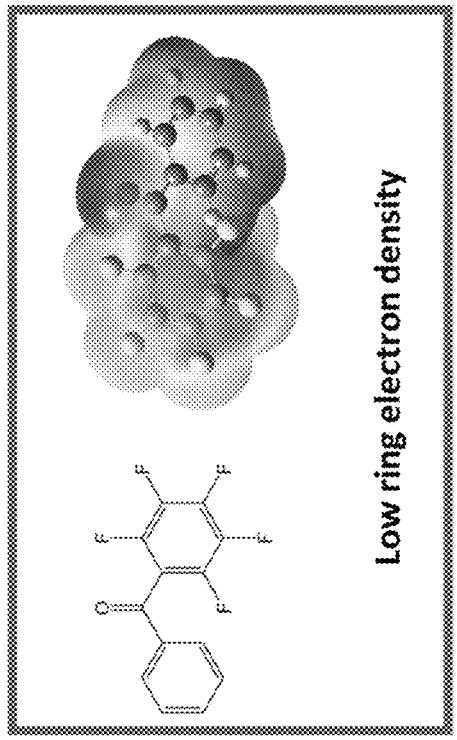
FIG. 2A
High ring electron density
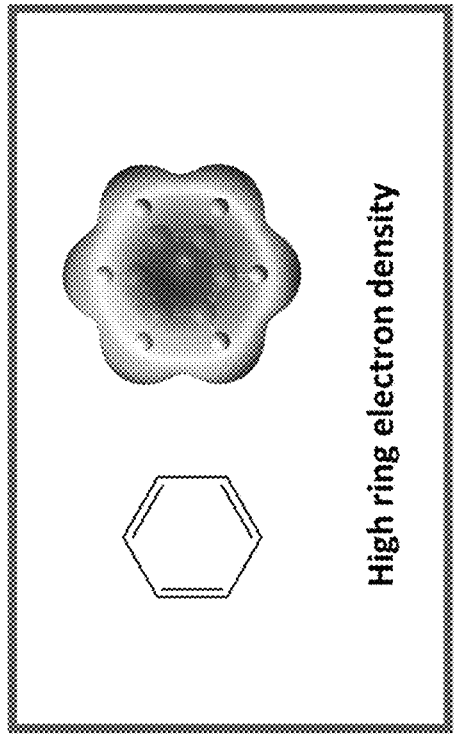
FIG. 2C
Low ring electron density
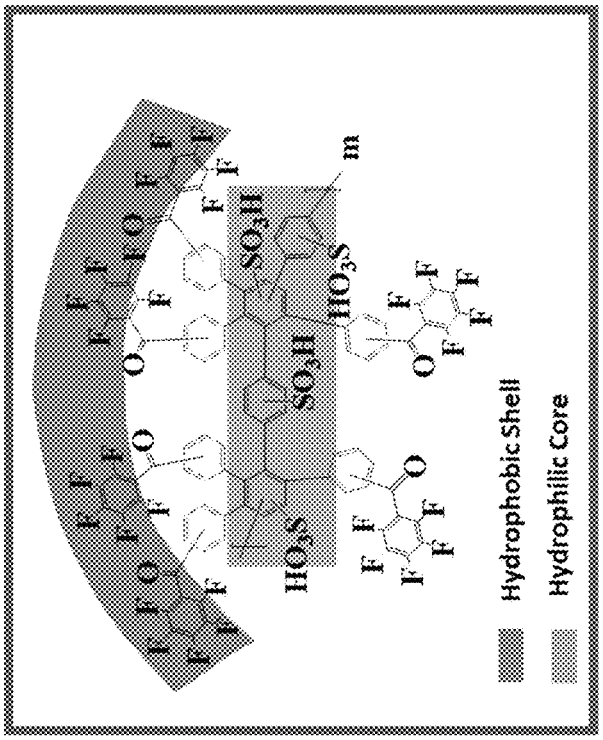
FIG. 2B
FIG. 2D

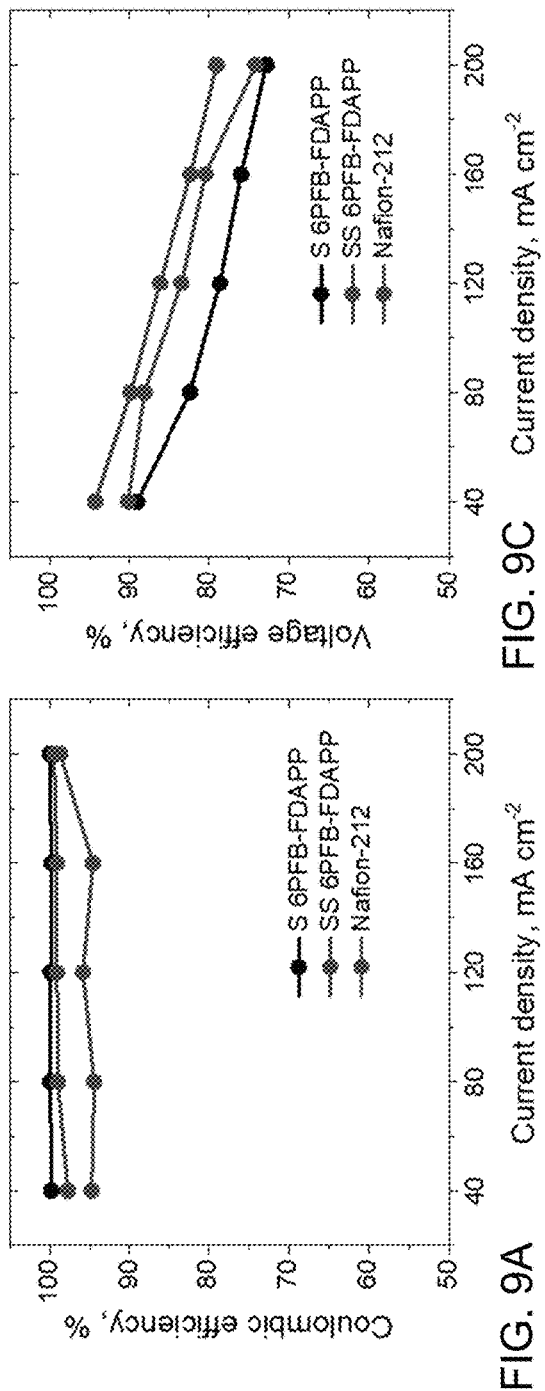
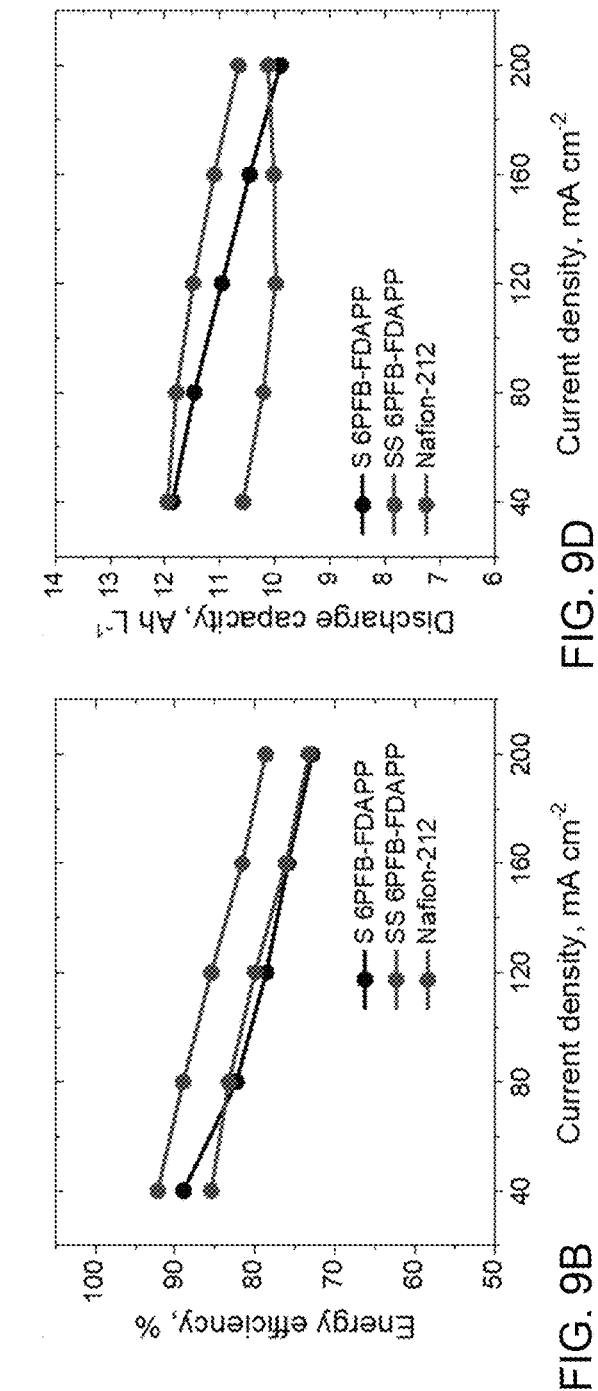
FIG. 9C
FIG. 9D
FIG. 9A
FIG. 9B

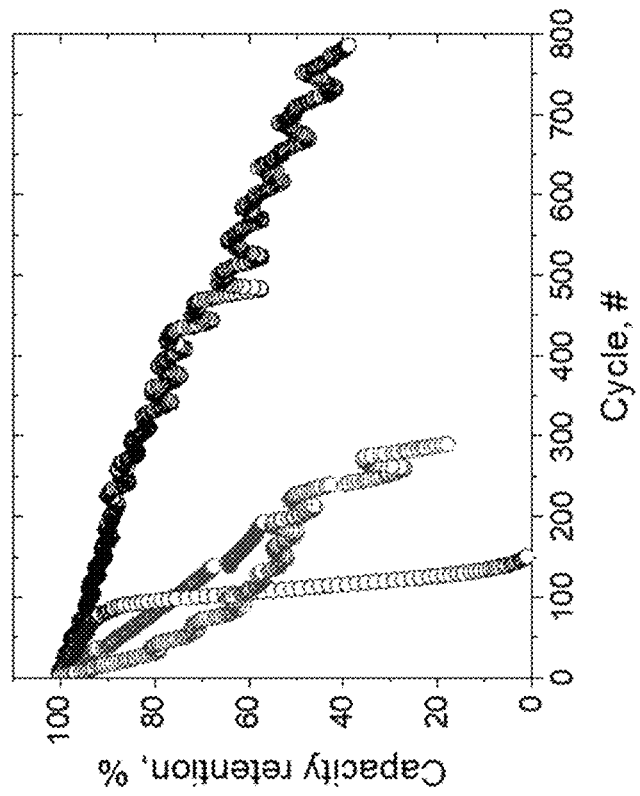
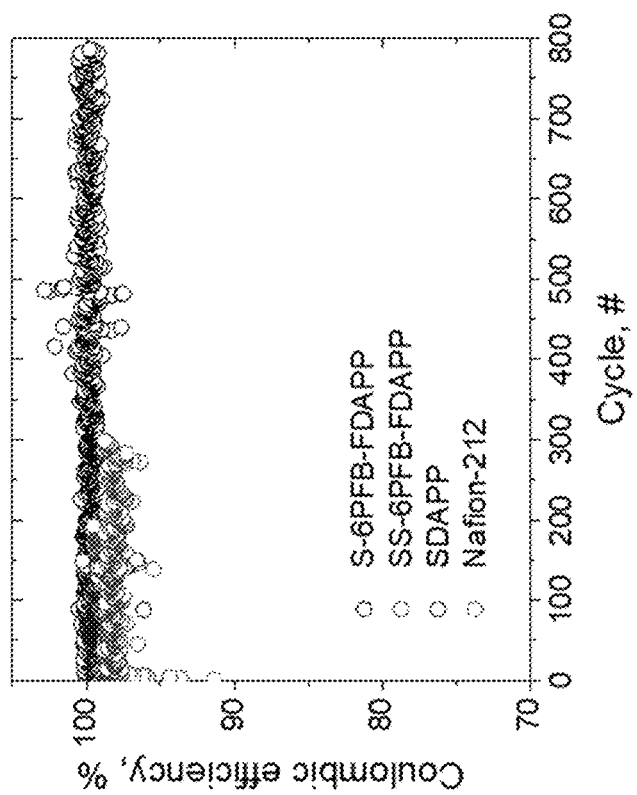
FIG. 10A
FIG. 10B

ION-SELECTIVE MEMBRANE FOR REDOX FLOW BATTERIES

CROSS-REFERENCE TO RELATED APPLICATION

This application claims the benefit of U.S. Provisional Application No. 63/067,989, filed Aug. 20, 2020, which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

FIELD OF THE INVENTION

The present invention relates to redox flow batteries and, in particular, to ion-selective membranes for redox flow batteries.

BACKGROUND OF THE INVENTION

Redox flow batteries (RFBs) are receiving increased attention for stationary large-scale applications, such as required to integrate renewable energy sources into the electrical grid, due to cost, reliability, and safety considerations. A primary advantage of RFBs is their large energy capacity, due to the ability to store the electrolytes in external electrolyte tanks. Vanadium redox flow batteries (VRFBs) are feasible candidates for renewable energy storage since this technology can readily be scaled, and is relatively safe and reliable. See A. Parasuraman et al., *Electrochim. Acta* 101, 27 (2013). To improve the VRFB's performance and lower costs, development of inexpensive next generation components such as electrolytes, electrodes and separators have spurred significant interest. See Z. Yang et al., *Chem. Rev.* 111, 3577 (2011); C. Minke and T. Turek, *J. Power Sources* 376, 66 (2018); and M. Gencten and Y. Sahin, Int. *J. Energy Res.* 44, 7903 (2020). FIG. 1 is a schematic illustration of a VRFB. In addition to the positive and negative electrolyte tanks, the VRFB comprises positive and negative electrode chambers, an ion-selective membrane separating the chambers, and flowable electrolytes. Electrolytes on both anode and cathode sides (i.e., anolyte and catholyte) use vanadium species to minimize crossover contamination, thus maintaining high cell efficiency. The electrolyte tanks store vanadium ions in four different oxidation states, $V^{2+}$, $V^{3+}$, $VO^{2+}$ (i.e., $V^{4+}$), and $VO_2^+$ (i.e., $V^{5+}$), such that there is a separate redox couple on each side. Sulfuric acid is typically used as the supporting electrolyte in an aqueous VRFB, although mixed acids are sometimes used to increase the solubility of the vanadium ions and, therefore, energy density of the battery. The anolyte and catholyte are fed through the separate half-cells within the battery via pumps and then returned to the storage tanks for recirculation. The ion-selective membrane separating the two half-cells preferably prevents mixing of the electrolytes, has low permeability to the reactive vanadium species, and is permeable for the supporting ions, such as protons. In addition to high ion selectivity and proton conductivity, the membrane should also be low cost and have high mechanical and chemical stability. During charging with the redox reaction, the catholyte is reduced to $V^{2+}$ whilst the anolyte is oxidized to $V^{5+}$. Recharging the battery moves electrons through external circuit from the positive to the negative side and causes hydrogen ions to diffuse through the membrane to the negative side. The same reactions occur in reverse during discharge. Similar electrochemical concepts and material needs apply to other flow and hybrid batteries technologies that are currently being developed.

The membrane separator plays a vital role in VRFB operations since it is responsible for ion transport to maintain charge neutrality and prevent anolyte/catholyte mixing which leads to self-discharge. The current state of the art membrane for VRFBs is perfluorinated sulfonic acid polymers (PFSA), such as Nafion, since they offer high proton conductivity, long term chemical stability and are a proven membrane technology in industry (e.g. chlor-alkali process). See P. Millet, 9—Chlor-alkali technology: fundamentals, processes and materials for diaphragms and membranes, in: A. Basile (Ed.) *Handbook of Membrane Reactors*, Woodhead Publishing, 2013, pp. 384-415. However, Nafion is not an ideal candidate for VRFBs since low cost is essential for grid scale energy storage in order to compete with fossil fuel generated electricity. The US DOE has targeted VRFB systems of <$100 kW/h and the high cost of Nafion ($500-700 $m^{-2}$) has been shown to substantially impact the overall cost of VRFB systems. See Z. Yang et al., *Chem. Rev.* 111, 3577 (2011); M. F. Mathias et al., *Electrochem. Soc. Interface* 14, 24 (2005); and V. Viswanathan et al., *J. Power Sources* 247, 1040 (2014). Another concern of Nafion in VRFBs is the low transport selectivity between protons and vanadium ions. See B. Schwenzer et al., *ChemSusChem* 4, 1388 (2011). Ion transport is determined by the size and shape of the hydrophilic domain which is ultimately a consequence of the polymer structure. The structure of Nafion consists of a Teflon-like backbone with intervals of a flexible side chain that is capped with a fluorocarbon sulfonic acid. Although Nafion has been studied for several decades, the polymer morphology of Nafion is still under debate. See K.-D. Kreuer and G. Portale, *Adv. Funct. Mater.* 23, 5390 (2013). Recently, Kreuer has suggested that the flexible sulfonic acid groups are held together with water acting as "glue" keeping the oppositely charged polymers together and forming water channels that are "locally flat and narrow". See K.-D. Kreuer, *Chem. Mater.* 26, 361 (2014). This concept of a lamellar-type hydrophilic morphology of Nafion may also explain the poor proton/vanadium transport selectivity, since a lamellar type morphology may offer a relativity unobstructed ion transport pathway.

SUMMARY OF THE INVENTION

The present invention is directed to an ion-selective membrane for a redox flow battery comprising a fluoro sulfonated poly(phenylene) wherein core aryl groups of the poly(phenylene) backbone are at least partially substituted with a sulfonic acid group and the aryl groups pendent to the backbone are at least partially substituted with a fluorocarbon group. The fluorocarbon can comprise a highly fluorinated electron withdrawing group, such as a pentafluorobenzoyl group.

A invention is further directed to a two-step method to synthesize fluoro sulfonated poly(phenylene), comprising providing a poly(phenylene) polymer comprising a backbone comprising core aryl groups a plurality of aryl groups pendent to the backbone; attaching at least one fluorocarbon group to at least one of the pendent aryl groups via an acylation reaction; and sulfonating at least one of the core aryl groups via an electrophilic aromatic substitution with sulfuric acid.

The fluoro sulfonated poly(phenylene) polymer design provides an external hydrophobic shell and internal hydrophilic core to improve the membrane transport properties and chemical stability. The synergy between external hydrophobic shell and internal hydrophilic core promoted the formation of narrow ionic channels, which results in the extremely low vanadium permeability and higher selectivity towards protons. Furthermore, the insertion of pentafluorobenzoyl groups greatly improves the chemical durability of membranes in highly oxidative $VO_2^+$ solutions (60 days, with no significant change in IEC, water uptake and weight). A fluoro sulfonated poly(phenylene) (S-6PFB-FDAPP) membrane showed excellent single cell performance and capacity retention. The coulombic efficiency (CE) and energy efficiency (EE) of the S-6PFB-FDAPP membrane was >99.9% and 73.2% at 200 mA cm$^{-2}$. The single cell also displayed stable CE for 800 cycles with just 0.075% per cycle capacity decay at 80 mA cm$^{-2}$. Together with excellent chemical stability and high cycling performance, S-6PBF-FDAPP shows great application stance for VRFBs.

BRIEF DESCRIPTION OF THE DRAWINGS

The detailed description will refer to the following drawings, wherein like elements are referred to by like numbers.

FIG. 2A is an electrostatic potential map of benzene, red color indicates high electron density. FIG. 2B illustrates the Diels Alder poly(phenylene) (DAPP) structure that distinguishes between pendent and core aryl groups. FIG. 2C is an electrostatic potential map of pentafluorobenzophenone, blue color indicates low electron density. FIG. 2D is an illustration of the concept of a hydrophobic exterior and hydrophilic core of fluoro sulfonated poly(phenylene).

FIGS. 9A-9D are graphs of the charge/discharge cycling performance (coulombic efficiency, energy efficiency, voltage efficiency, and discharge capacity) of S-6PFB-FDAPP, SS-6PFB-FDAPP and Nafion-212 membranes between 40-200 mA cm$^{-2}$ current density.

FIGS. 10A and 10B are graphs of the long-term cycling performance (coulombic efficiency and capacity retention) of the S/SS-6PFB-FDAPP membranes in VRFBs at the current density of 80 mA cm$^{-2}$.

DETAILED DESCRIPTION OF THE INVENTION

Figure 1:
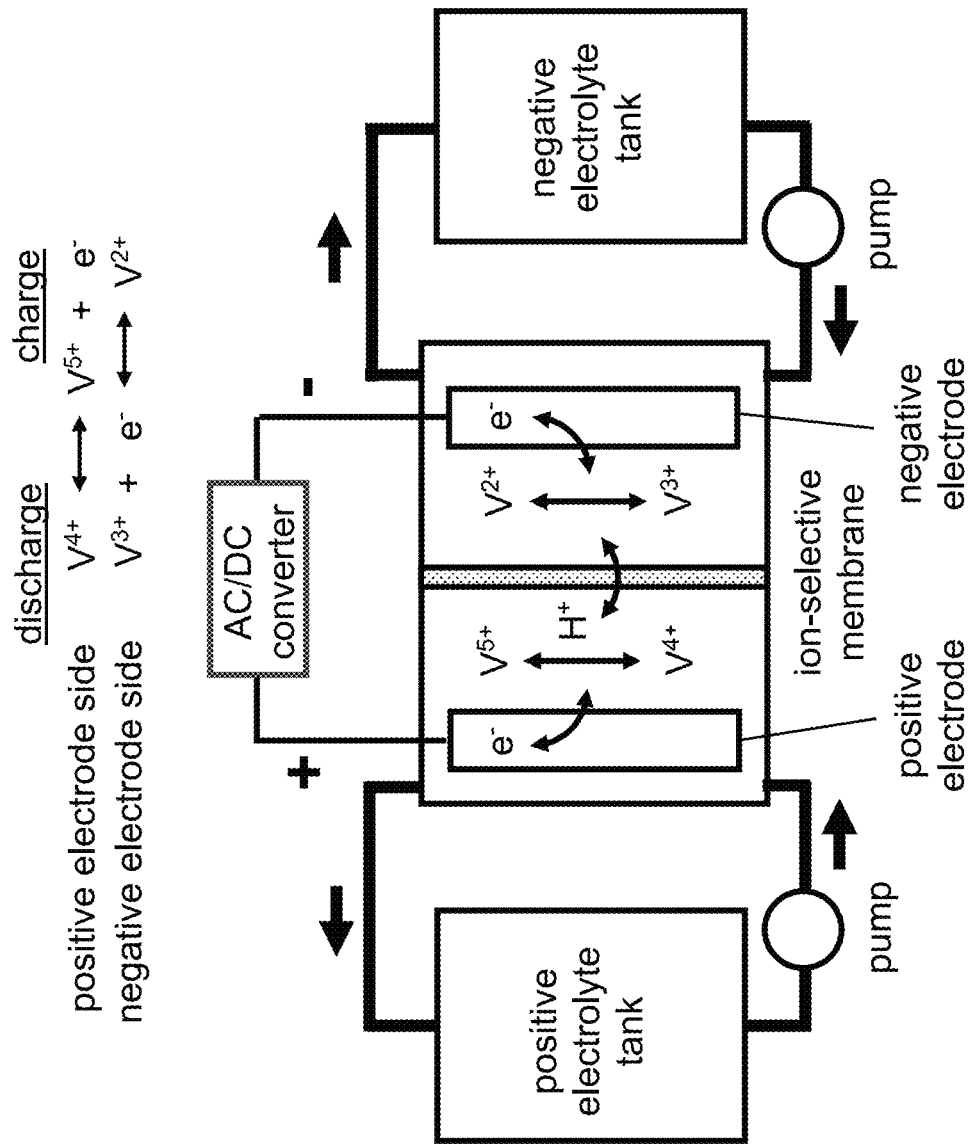
FIG. 1 is a schematic illustration of a vanadium redox flow battery (VRFB).

There has been tremendous interest in developing a low cost, sulfonated hydrocarbon polymer analogue to Nafion that offers a higher degree of polymer structure manipulation. Sulfonated hydrocarbons are typically designed similar to Nafion; a hydrophobic backbone with sulfonic acid attached through a side chain. See N. Li and M. D. Guiver, *Macromolecules* 47, 2175 (2014); B. P. Gindt et al., *J. Membr. Sci.* 532, 58 (2017); and X. Zhang et al., *J. Mater. Chem. A* 1, 11389 (2013). However, this type of polymer is not ideal for high ion selectivity since sulfonic acid moieties on a flexible side chain will more easily aggregate and form larger hydrophilic domains. See T. Kobayashi et al., *Solid State Ion.* 106, 219 (1998). Therefore, the present invention uses a polymer design strategy that is inverse to Nafion, wherein the side chain or external functionalization is hydrophobic and the sulfonic acid groups are attached onto the internal polymer backbone. This type of structure forces the hydrophilic channel to be near the polymer backbone and impedes large sulfonic acid aggregation, while the external hydrophobic shell prevents neighboring polymer chains from developing ionic interactions.

Although sulfonated hydrocarbons offer a low-cost solution to PFSAs and the polymer structure can be readily modified, the stability of even fully aromatic-containing polymers in highly oxidative environments, as in the case of VRFB, is poor. For example, cation and anion exchange membranes based on ether linkage free poly(phenylene)s synthesized through Diels Alder condensation were found to react in dilute $VO_2^+$ (0.1 M), indicating that even fully aromatic polymers are susceptible to $VO_2^+$ oxidation. See C. Fujimoto et al., *Electrochem. Commun.* 20, 48 (2012); and C.-N. Sun et al., *Electrochem. Commun.* 43, 63 (2014). Recent work by Holdcroft has suggested that sulfonated DAPPs that contain both unfunctionalized and sulfonated aryl rings (electron poor) are oxidized by hydroxyl radicals (generated by Fenton's reagent) but that oxidation occurs primarily at the electron rich, unfunctionalized aryl group. See T. Holmes et al., *Chem. Mater.* 31, 1441 (2019).

A reason that unfunctionalized aryl groups are prone to oxidation is the presence of high electron ring density. For example, in Friedel-Craft acylation benzene reacts twice as fast with an acylation agent compared to chlorobenzene. See H. C. Brown and M. Grayson, *J. Am. Chem. Soc.* 75, 6285 (1953). This occurs because benzene has a higher basicity or electron density than chlorobenzene, due to the fact that the electronegative chloride inductivity reduces ring electron density. High electron density is the driving force in aromatic electrophilic substitution reactivity and such groups can be expected to react quickly with strong oxidizers such as hydroxyl radicals and $VO_2^+$. See C. Fujimoto et al., *Electrochem. Commun.* 20, 48 (2012); and C.-N. Sun et al., *Electrochem. Commun.* 43, 63 (2014). Computational models can provide electrostatic potential maps (EPM) that can be used to visualize electron density. FIG. 2A displays the EPM of benzene, where the color red indicates high electron density. As shown in FIG. 2B, DAPP is a fully aromatic polymer with pendent aryl groups in red and backbone (core) aryl groups in black. Since DAPP consists entirely of unfunctionalized aryl rings, the first step is to incorporate strong electron withdrawing groups in all of the pendent aryl rings. Although the reactivity of both pendent and core aryl groups are equivalent, due to accessibility (steric hindrance), post functionalization of DAPP initially occurs at the pendent rings. Indeed, the electrophilic functionalization of all exterior rings has been reported. See C. Fujimoto et al., *Polymer* 158, 190 (2018).

The present invention is directed to a fluoro sulfonated poly(phenylene) membrane material comprising fluorine groups attached to the pendent (lateral) aryl groups of a poly(phenylene) structure and sulfonic acid groups located only on the interior (core) aryl groups of the poly(phenylene) backbone. An exemplary structure has the pendent aryl groups functionalized with pentafluorobenzoyl and the backbone aryl groups have attached sulfonic acid moieties.

To synthesize this exemplary structure, a 2,3,4,5,6-pentafluorobenzoyl (PFB) moiety is first attached to each pendent aryl ring of poly(phenylene) followed by sulfonation. The PFB was chosen due to its hydrophobicity. In particular, the highly fluorinated PFB groups are strongly electron withdrawing. When attached to benzene, as in pentafluorobenzophenone, the electrostatic potential map (FIG. 2C) of the non-fluorinated phenyl group is blue, which indicates lower electron density compared to benzene (FIG. 2A) and suggests lower oxidation reactivity. Advantageously, this also makes the pendent aromatic groups impervious to sulfonation while the core aryl groups are susceptible to reaction with sulfuric acid. The resultant structure has a hydrophobic shell due to the heavy fluorinated external benzoyl groups, while the sulfonated polymer core will form narrow hydrophilic channels in contact with aqueous solutions, as shown in FIG. 1D. It is expected that shielding by a hydrophobic shell will protect the aryl groups from $VO_2^+$ attack and the close proximity of the sulfonic acid groups on the backbone will narrow the hydrophilic domain size to improve ion selectivity.

Attachment of PFB onto Pendent Aryl Groups of FDAPP; 6PFB-FDAPP

Figure 3:
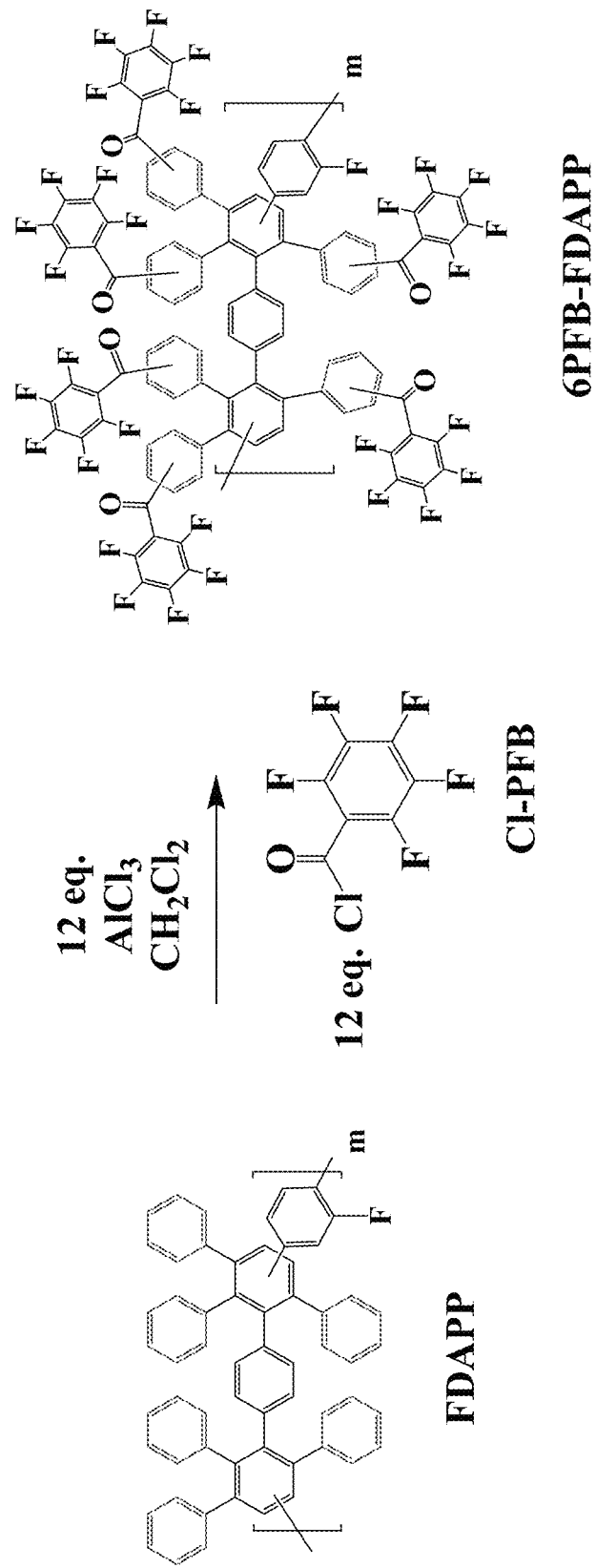
FIG. 3 illustrates a synthesis scheme for benzoylation of FDAPP with PFB.
Figure 5:
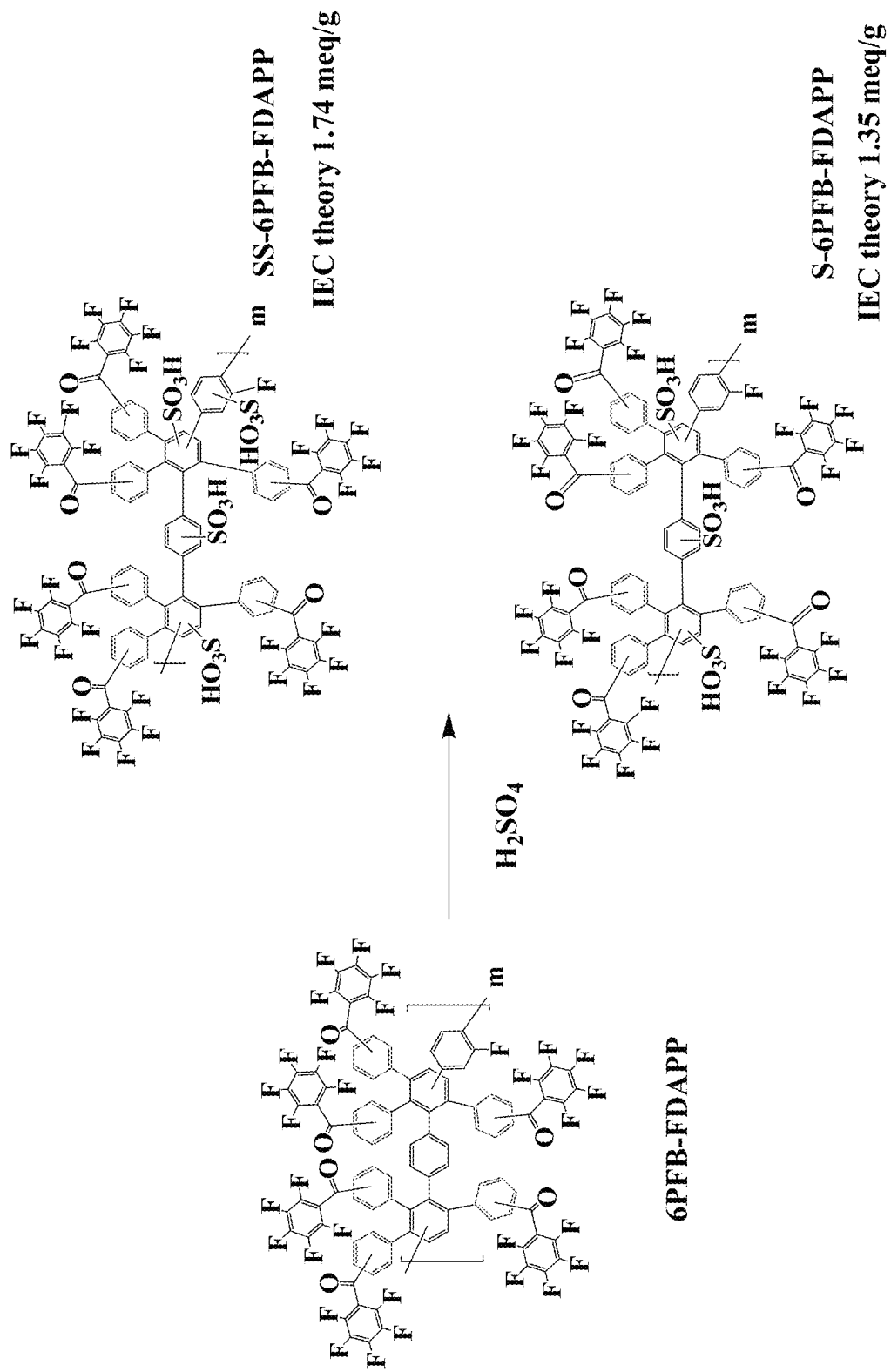
FIG. 5 illustrates a synthesis scheme for sulfonation of 6PFB-FDAPP.

The sequential synthesis of an exemplary fluoro sulfonated poly(phenylene) with a hydrophobic exterior and hydrophilic interior is shown in FIGS. 3 and 5. The polymer can comprise m repeat units, where m is an integer from 1 to about 500. The pendent and backbone aryl groups of the poly(phenylene) structure can be formed using a Diels-Alder reaction, as described in U.S. Pat. No. 9,580,541, which is incorporated herein by reference.

The first step of the synthesis involves the Friedel Crafts benzoylation of all pendent aryl rings in DAPP. In order to quantify the attachment of the heavily fluorinated PFB group, a single fluorine was incorporated on the DAPP backbone and is referred to as FDAPP. The synthesis FDAPP through reaction between bis-tetracyclone and 1,4-diethynyl-2-fluoro benzene in diphenyl ether has been previously reported. See C. Fujimoto et al., *Polymer* 158, 190 (2018). The substitutions begin by attaching fluorine-containing groups (pentafluorobenzoyl groups in this example) onto the pendent aryl groups of the poly(phenylene) structure as shown in FIG. 3. This can be accomplished by catalyzing the acylation reaction of the aryl groups with pentafluorobenzoyl chloride using aluminum trihalides ($AlX_3$) or triflic acid.

As shown in FIG. 3, FDAPP in the presence of excess PFB-Cl and $AlCl_3$ generates 6PFB-FDAPP. As an example of the fluorination step, to a 500 mL three neck round bottom flask, 5 g of FDAPP (6.2 mmol) was dissolved in 300 mL of dichloromethane and cooled in an ice bath for 30 minutes under $N_2$. To this cooled, yellow solution, an excess of aluminum trichloride (9.9 g, 74.2 mmol) and 2,3,4,5,6-pentafluorobenzoyl chloride (PFB-Cl, 17.1 g, 74.2 mmol) was added and the reaction mixture darkened to a deep orange solution. After 15 h, this solution was added to 200 mL of DI water and instantly the solution turned from a dark orange to a light-yellow. The mixture was heated to 40° C. to boil off dichloromethane and leave a solid. This solid was redissolved in 50 mL of chloroform and precipitated in ethanol two times, resulting in a light orange powder (10 g, 5.0 mmol). This polymer is designated as 6PFB-FDAPP since there are six PFB groups attached on the pendent rings of FDAPP.

Figure 4:
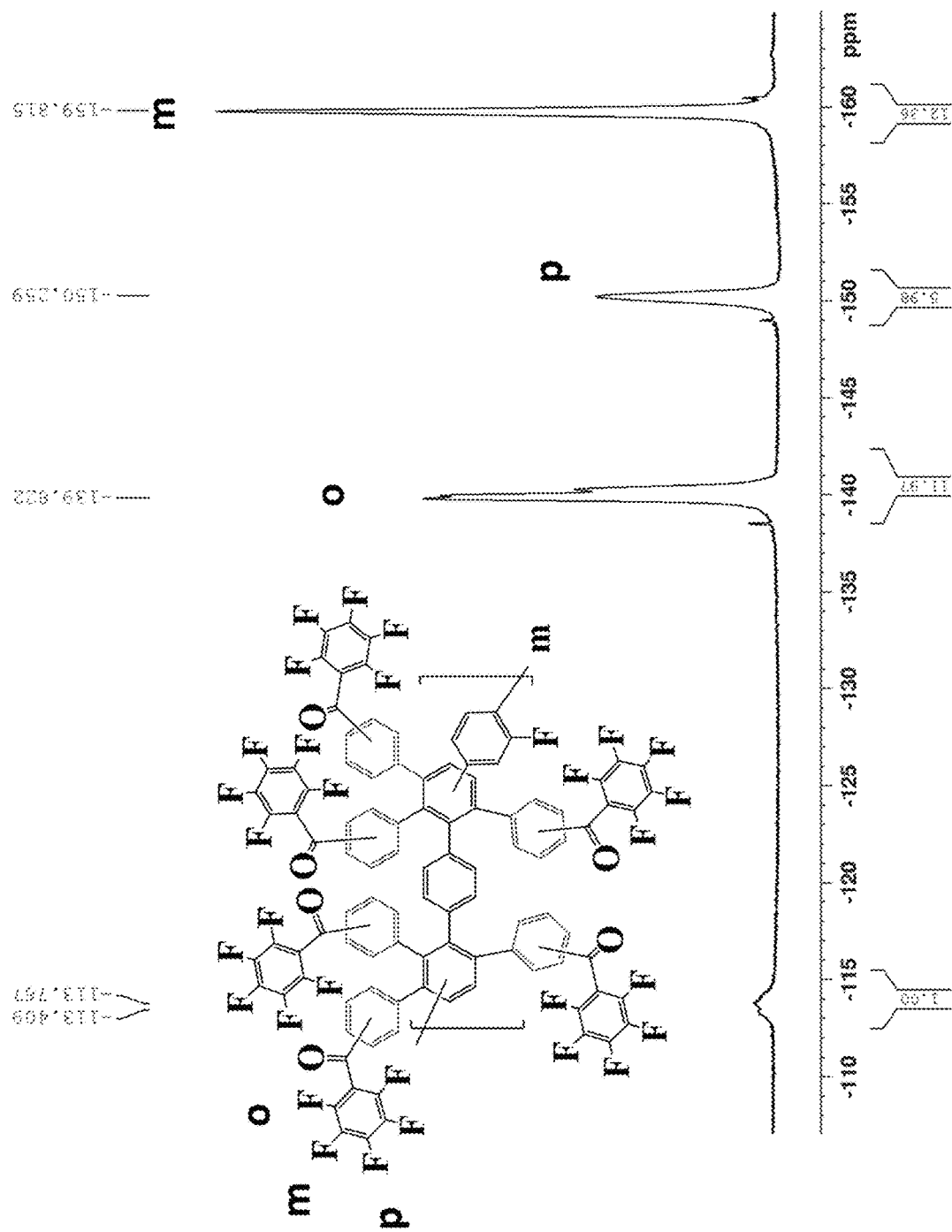
FIG. 4 shows the $^{19}$F-NMR spectra of 6PFB-FDAPP.

The $^{19}$F-NMR of 6PFB-FDAPP, shown in FIG. 4, has four fluorine peaks which stems from the meta (−139 ppm), para (−150 ppm), ortho (−160 ppm) fluorine of PFB and the backbone fluorine (−113 ppm). The peak intensity of the para fluorine (−150 ppm) compared to the backbone fluorine (−113 ppm) is 6:1 which indicates all the pendent rings have been functionalized.

Sulfonation of 6PFB-FDAPP at 50° C.; S-6PFB-FDAPP

The second step of the synthesis involves the sulfonation of the backbone aryl rings. Since the pendent aryl rings (red) of 6PFB-FDAPP are attached to an electron withdrawing ketone they are inert towards electrophilic sulfonation with 95-98% sulfuric acid, while the backbone aryl rings (black) are reactive towards substitution. See P. Xing et al., *J. Membr. Sci.* 229, 95 (2004); and A. Iulianelli and A. Basile, *Int. J. Hydrog. Energy* 37, 15241 (2012). Therefore, the backbone aryl groups of the fluorinated polymer can be sulfonated via an electrophilic aromatic substitution by dissolving the fluorinated polymer in sulfuric acid at temperatures above room temperature for sufficient time to provide a fluoro sulfonated poly(phenylene). Alternatively, phosphonic acid groups can be attached to the backbone aryl groups.

As an example of the sulfonation step, in a 100 mL single neck round bottom, 5 g of 6PFB-FDAPP (2.5 mmol) and 100 mL of sulfuric acid was stirred under $N_2$ at 50° C. The slurry slowly dissolved in sulfuric acid and was stirred for 14 h and the dark solution and then added to ice water at room temperature. A brown powder precipitated and was stirred for at least 1 h. The brown powder was filtered and rinsed with DI water several times until the filtrate had a pH of 7. The off-white powder (4.8 g, 2.1 mmol) was dried in a vacuum at 50° C. for 24 h. As will be described below, the resulting polymer is designated as S-6PFB-FDAPP.

Membrane Cast of S-6PFB-FDAPP

To prepare a membrane, 0.5 g of S-6PFB-FDAPP was dissolved in 25 mL of DMSO at room temperature for 6 h. The brown solution was filtered through a 2 μm syringe filter (glass microfiber filter). The solution was cast onto a clean glass plate in a vacuum oven at 70° C. and 100 torr for 14 h. After this time, the DMSO had been removed and the resultant film was cooled to room temperature on the casting plate and then peeled off. The film was then rinsed thoroughly with deionized water and then soaked in 1 L of 1 M $H_2SO_4$ at 80° C. for 1 h and rinsed again with DI water to remove any excess acid.

Water Uptake, Ion Exchange Capacity, Proton Conductivity and Vanadium Ion Permeability To determine the water uptake, a pre-weighed membrane sample with 1×4 cm dimension was soaked in DI water for 24 h at room temperature. The membrane sample was then taken out and the weight gain and thickness changes were recorded. The water uptake and swelling ratio were calculated by using the equation:

$$\text{Water uptake (\%)} = \frac{m_{wet} - m_{dry}}{m_{dry}} \times 100$$

where $m_{wet}$, $m_{dry}$ is the weight of the wet and dry membranes.

The ion exchange capacity (IEC) of the membrane was determined by acid base titration and $^1$H NMR. The pre-weighed membrane sample was soaked in NaCl solution for 24 hour and titrated against NaOH solution with phenolphthalein as an indicator. The IEC of the membrane was calculated using the equation:

$$IEC(meqg^{-1}) = \frac{C_{NaOH} \times V_{NaOH}}{m_{dry}}$$

where $C_{NaOH}$ and $V_{NaOH}$ are the concentration and volume of NaOH.

The proton conductivity (mS cm$^{-1}$) was calculated from electrochemical impedance spectroscopy spectrum. The 3×1 cm sample was loaded in conductivity cell and placed in DI water. The membrane resistance values were measured in the in-plane direction and proton conductivity was calculated using the equation:

$$\text{Proton conductivity } (\sigma, \text{mS cm}^{-1}) = \frac{L \text{ (cm)}}{R \text{ (m}\Omega) \times d \text{ (cm)} \times W \text{ (cm)}}$$

where L is the distance between electrodes, R is the membrane resistance, d is the membrane thickness and W is the membrane width.

The vanadium ion permeability of the membranes was determined using a two-chamber diffusion cell, where one chamber was filled with 1 M VOSO$_4$ solution in 2.5 M H$_2$SO$_4$ and other chamber was filled with 1 M MgSO$_4$ solution in 2.5 M H$_2$SO$_4$ to nullify the effects of osmotic pressure. The sample of MgSO$_4$ chamber was analyzed for VO$^{2+}$ ion with the help of UV/Vis spectrometer at 765 nm wavelength. The vanadium ion permeability (P) was calculated using the equation:

$$V\frac{dC_t}{dt} = S\frac{P}{L}[C_0 - C_t]$$

where V is the volume of the VOSO$_4$ chamber, $C_o$ and $C_t$ are the concentrations of vanadium ion concentration at time 0 and t, S is the effective area, and L is the thickness of membrane.

Membrane Properties of Sulfonated 6PFB-FDAPP

The polymer labeled SS-6PFB-FDAPP in FIG. 5 has all four of the core aryl rings functionalized with sulfonic acid. This polymer has a theoretical IEC of 1.74 meq/g. However, the actual rate of sulfonation of 6PFB-FDAPP was impacted by the bulky PFB shell and also influenced by the backbone fluorine. For example, when 6PFB-FDAPP was sulfonated at room temperature for 24 h the experimental IEC was 1.1 meq/g (water uptake 16%) which equates to only approximately two sulfonic acids per repeat unit (2 SO$_3$H per repeat unit IEC=0.94 meq/g). This indicates that the 6PFB-FDAPP slowed the sulfonation kinetics. Therefore, the reaction temperature was increased to 50° C. and reacted for 14 h and the resultant IEC was 1.4 meq/g which corresponds to three sulfonic acid units per repeat unit. Moreover, after 48 h at 50° C. the IEC remained unchanged (1.4 meq/g), suggesting that the core aryl ring containing fluorine of FDAPP was relatively resistant towards sulfonation (compared to the non-fluorinated core rings), resulting in the polymer labeled S-6PFB-FDAPP in FIG. 5. Fluorine-containing aryl rings have been reported to reduce its reactivity with 95-98% H$_2$SO$_4$ and similarly here, the slight electron withdrawing property of this group reduces the kinetics of sulfonating the fluorine-containing core aryl ring. See B. Liu et al., *Macromolecules* 40, 1934 (2007). In order to sulfonate all of the core aryl rings, higher temperature (65° C.) was required to generate the fully sulfonated SS-6PFB-FDAPP.

S-6PFB-FDAPP and SS-6PFB-FDAPP are soluble in polar aprotic solvents (n-methylpyrrolidone (NMP), dimethylacetamide (DMAC), etc.) and were cast into films from solutions of dimethylsulfoxide (DMSO) from a vacuum oven at 70° C. Neither polymers are soluble in non-polar solvents, such as chloroform, toluene, etc. Relevant film properties of S-6PFB-FDAPP and SS-6PFB-FDAPP are compared to Nafion-212 and previously reported pendent-sulfonated DAPP (SDAPP) in Table 1. See C. Fujimoto et al., *Electrochem. Commun.* 20, 48 (2012).

TABLE 1

Physical properties of membranes
(IEC, water uptake, vanadium permeability, proton conductivity and ion selectivity).

| Membranes | Reaction Temperature, reaction time 24 hr | IEC, meq g$^{-1}$ IEC$_{theory}$ | ICE$_{exp}$ | Water uptake, % | Vanadium permeability (VO$^{2+}$), cm$^2$ min$^{-1}$ | Proton conductivity, mS cm$^{-1}$ | Ion Selectivity 10$^7$ mS min cm$^{-3}$ |
|---|---|---|---|---|---|---|---|
| S-6PFB-FDAPP | 50° C. | 1.3 | 1.4 | 25 | 4.25 × 10$^{-8}$ | 32.9 | 77.4 |
| SS-6PFB-FDAPP | 65° C. | 1.7 | 1.8 | 65 | 8.15 × 10$^{-7}$ | 51.7 | 6.34 |
| Nation-212 | — | — | 0.95 | 32 | 6.0 × 10$^{-6}$ | 103.7 | 1.73 |
| SDAPP * | — | — | 1.4 | 36 | 4.4 × 10$^{-7}$ | 49 | 11 |
| SDAPP * | — | — | 1.6 | 78 | 8.1 × 10$^{-7}$ | 78 | 9.6 |

* C. Fujimoto et al., *Electrochem. Commun.* 20, 48 (2012).

The SS-6PFB-FDAPP with an IEC of 1.8 meq g$^{-1}$ has nearly double the water uptake of Nafion-212 (65% to 32%, respectively) and an order of magnitude lower vanadium permeability. However, when compared to previously reported SDAPP with a similar IEC of 1.6 meq g$^{-1}$, SS-6PFB-FDAPP has a slightly lower water uptake (65% compared to SDAPP 78%) but nearly equivalent vanadium permeability. The S-6PFB-FDAPP displayed a slightly lower water uptake compared to Nafion-212 (25% to 32%, respectively) and nearly two orders of magnitude lower vanadium permeability. When S-6PFB-FDAPP is contrasted to SDAPP with an equivalent IEC (1.4 meq g$^{-1}$), S-6PFB-FDAPP has a slightly lower water uptake (25% to 36%, respectively), and an order of magnitude lower vanadium permeability. The lower water uptake of the core sulfonated polymers (S/SS-6PFB-FDAPP) compared to pendent sulfonation (SDAPP) with nearly identical IECs indicate that core sulfonation has impacted hydrophilic aggregation (lower water uptake=smaller hydrophilic domains) and can drastically influence vanadium permeability, as is observed in S-6PFB-FDAPP.

Proton conductivity was also measured for all samples and followed a similar trend as vanadium permeability; increasing water uptake leads to an increase in both vanadium permeability and proton conductivity. A potentially more meaningful measurement is the ratio of proton conductivity and vanadium diffusion, which is termed ion selectivity. Here a larger value is desired since it represents a higher selectivity of proton conduction over vanadium permeation. SS-6PFB-FDAPP displayed an ion selectivity 2× larger than Nafion-212 (6.34 vs 1.73, respectively), however S-6PFB-FDAPP had more than an order of magnitude higher ion selectivity than SS-6PFB-FDAPP (77.4 vs 6.34 respectively). Moreover, core sulfonated S-6PFB-FDAPP had an ion selectivity value 7× higher than the corresponding pendent-sulfonated SDAPP (77.5 vs 11, respectively) suggesting core sulfonation was leading to proton conduction channels that are narrower and can exclude vanadium ions more effectively than pendent SDAPP or Nafion-212. The higher ion selectivity value of S-6PFB-FDAPP over SS-6PFB-FDAPP indicates better VRFB performance. Therefore, the reminder of the physical characterization and discussion focuses on S-6PFB-FDAPP.

Characterization of 6PFB-FDAPP and S-6PFB-FDAPP

Figure 6:
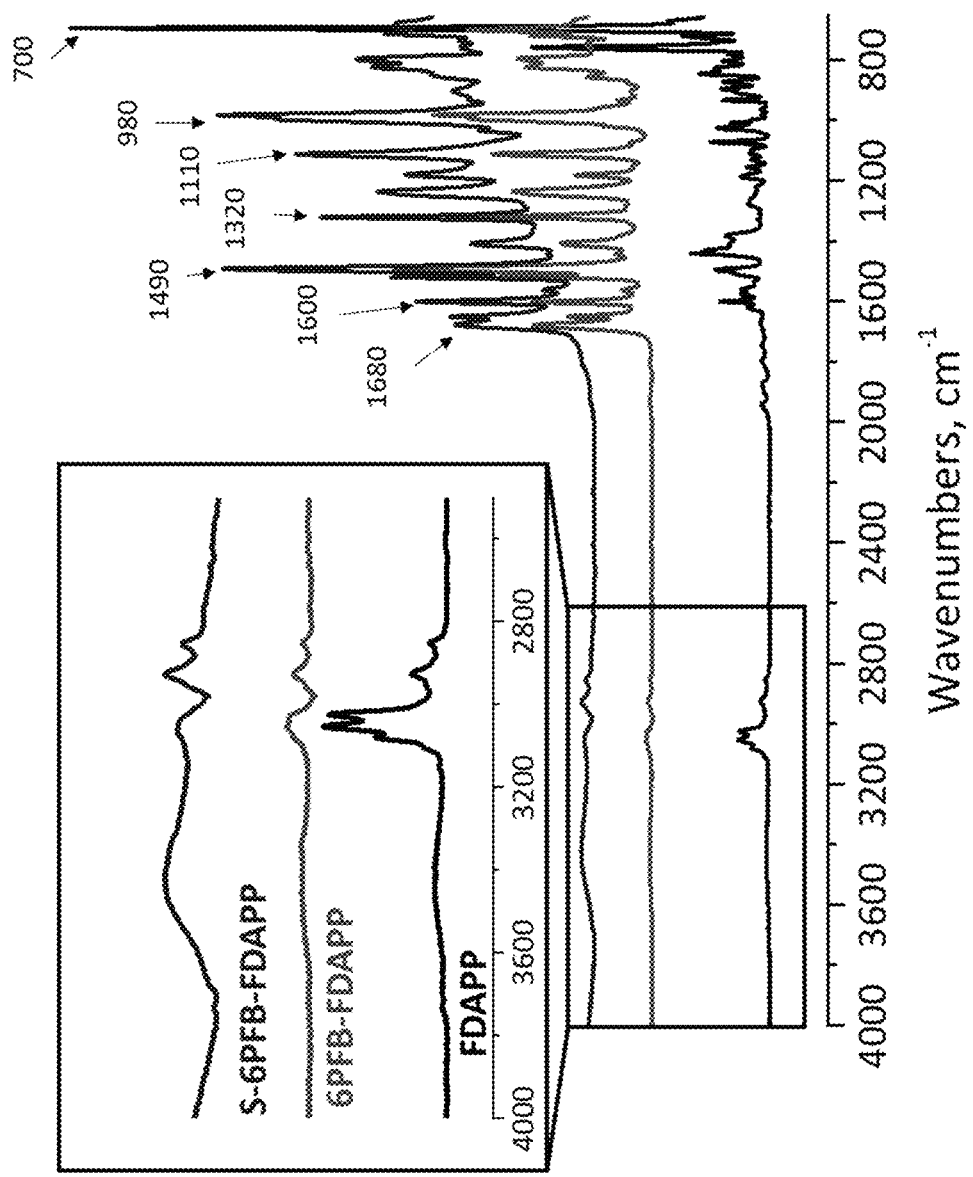
FIG. 6 shows FT-IR spectra of Diels-Alder polymers (FDAPP, 6PFB-FDAPP, and S-6PFB-FDAPP).

FIG. 6 shows the FT-IR comparison of FDAPP, 6PFB-FDAPP and S-6PFB-FDAPP. FDAPP has several peaks indicative of a fully aromatic polymer, such as the aromatic C—H stretches between 2970-3100 cm$^{-1}$, C=C stretches (in ring) at 1600 cm$^{-1}$, and the strong absorption of the aromatic out-of-plane C—H bending at 700 cm$^{-1}$. After substitution with PFB groups the FT-IR of 6PFB-FDAPP has a carbonyl peak at 1680 cm$^{-1}$, C—C ring stretch (of C$_6$F$_5$) at 1110 cm$^{-1}$ and the C—F bonds of pentafluorobenzoyl group have strong signature peaks at 1490, 1320 and 980 cm$^{-1}$ that are comparable to reported FT-IR values found in pentafluorobenzene-type compounds. See D. Steele and D. H. Whiffen, *Spectrochim. Acta* 16, 368 (1960); and P. J. N. Brown and E. F. Mooney, *Spectrochim. Acta A* 24, 1317 (1968). The FT-IR spectra of 6PFB-FDAPP and S-6PFB-FDAPP were nearly identical and it was difficult to clearly distinguish sulfonic S=O stretching peaks (found 1335-1372 cm$^{-1}$) since these signals are located near or overlapped peaks of C—F bonds. However, S-6PFB-FDAPP had a broad peak water peak at 3400 cm$^{-1}$ (see inset FIG. 6) which is due to the presence of water associated with the sulfonic acid, even after the samples were thoroughly dried before analysis. The FT-IR analysis of SS-6PFB-FDAPP was identical to S-6PFB-FDAPP.

Figure 7:
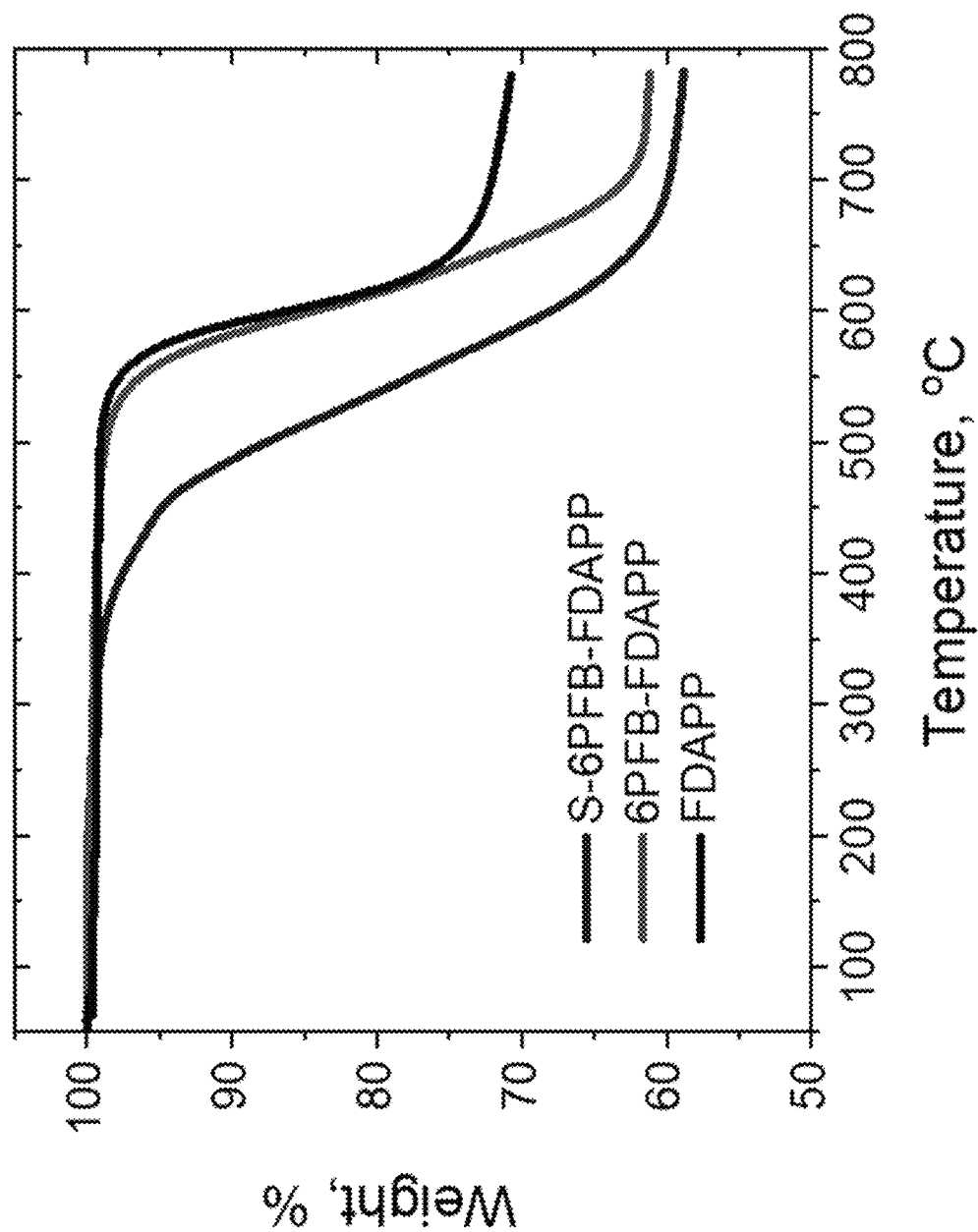
FIG. 7 shows thermogravimetric analysis of Diels-Alder poly(phenylene)s (FDAPP, 6PFB-FDAPP, and S-6PFB-FDAPP).

Thermogravimetric analysis (TGA) of FDAPP, 6PFB-FDAPP and S-6PFB-FDAPP were run between the temperatures of 50 to 850° C. under nitrogen and are presented in FIG. 7. Due to the high thermal stability of aryl-aryl bonds, FDAPP experienced no weight loss until over 500° C. with an initial 5% weight loss (T$_{5\%}$) at 560° C. at which point thermal degradation of the backbone occurred. The 6PFB-FDAPP is not entirely aromatic since it contains ketone (benzoyl) functionalization, however, the TGA of 6PFB-FDAPP is similar to FDAPP and shows a single weight loss with a T$_{5\%}$ of 540° C. The S-6PFB-FDAPP was first heated to 105° C. for 30 minutes to remove residual water (approximately 5% weight) and then equilibrated at 50° C. before data collection. The S-6PFB-FDAPP has the lowest T$_{5\%}$ of 430° C., and had two weight loss events. The first between 200-460° C. corresponding to a weight loss of 7% is due to the cleavage of the C—S bond (loss of SO$_3$H) and is consistent with the temperature range of aryl-503H cleavage and the theoretical 10 wt % of SO$_3$H in S-6PFB-FDAPP. See C. H. Fujimoto et al., *Macromolecules* 38, 5010 (2005). The second event has a steep weight loss that begins at 460° C. and plateaus at 680° C. associated with backbone degradation. The backbone thermal degradation in S-6PFB-FDAPP occurs approximately 100° C. lower than 6PFB-FDAPP and suggests that once the sulfonic acid groups located in the core (backbone) are cleaved, the resulting byproducts readily degrade at higher temperatures. This is further evidence that sulfonation is occurring at the core since in previously reported pendent-sulfonated SDAPP the backbone degradation occurs at a similar temperature to DAPP because cleavage of pendent sulfonic acid groups does not alter the core, therefore the backbone degradation temperature is not impacted. See C. H. Fujimoto et al., *Macromolecules* 38, 5010 (2005).

Figure 8:
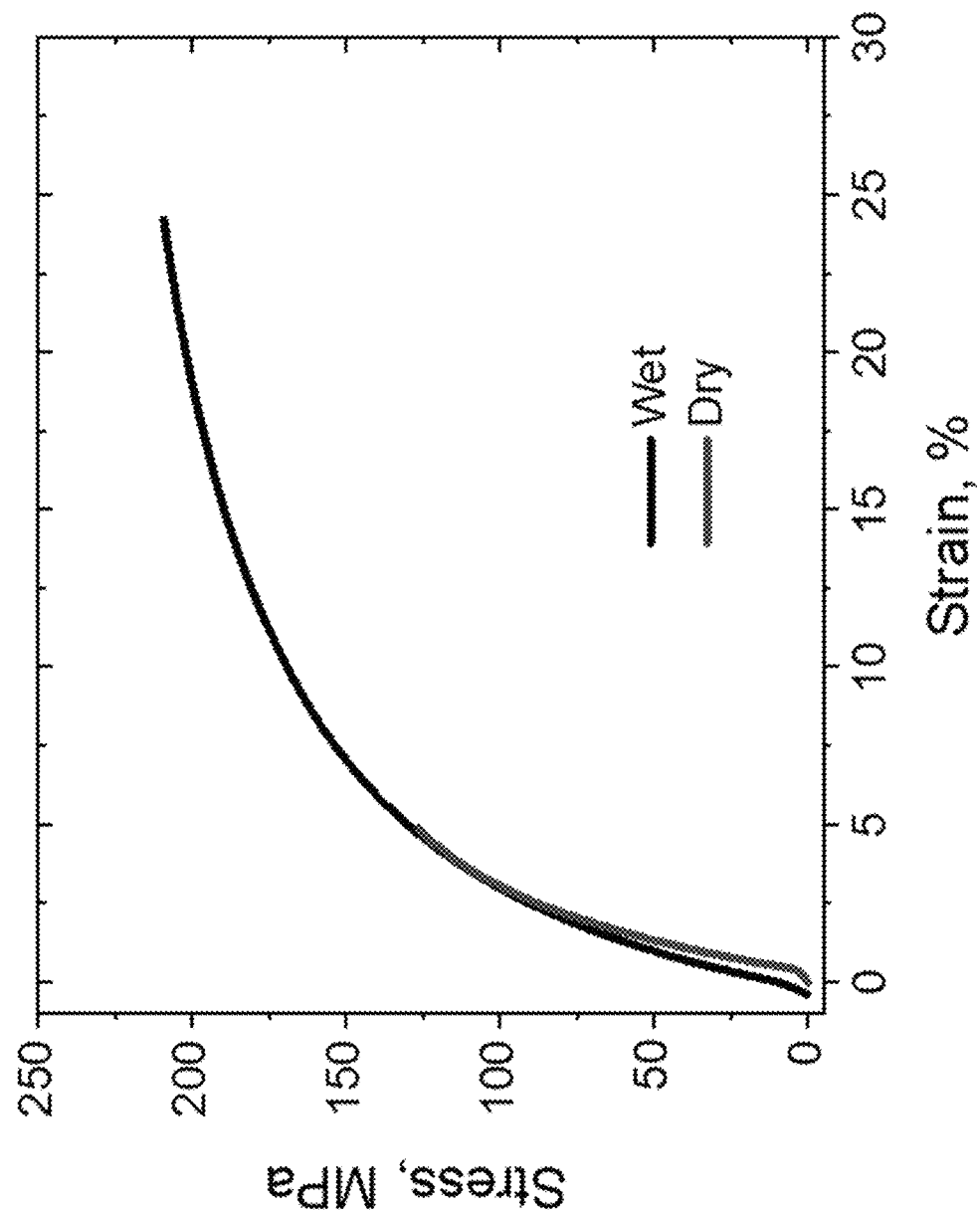
FIG. 8 shows the mechanical properties of S-6PFB-FDAPP membranes.

The mechanical properties of both dry and wet S-6PFB-FDAPP were measured under tensile deformation at room temperature and are plotted in FIG. 8. Dry S-6PFB-FDAPP showed stress-strain profiles expected for a thermoplastic with a high tensile modulus (130 MPa) and a relatively low strain-at-break (5%). When S-6PFB-FDAPP was stored overnight in 1.5 M VO$^{2+}$/1.5 M H$_2$SO$_4$ and blot dried before being analyzed, it displayed the same dry modulus, but had a strain-at-break 5× larger than the dry film since water softens the membrane. Good mechanical properties are associated with high molecular weight and the starting materials of S-6PFB-FDAPP, FDAPP and 6PFB-FDAPP weights were measured and had number average molecular weight (Mn) values of 62 and 73 k with polydispersity index of 2.4 and 2.9, respectively.

Chemical Durability of S-6PFB-FDAPP Membranes

In addition to a high ratio of proton to vanadium transport, membrane stability in highly reductive (V$^{+2}$) and oxidative (VO$_2^+$) environments is extremely pertinent for long-term energy storage. Of the various vanadium oxidation states in VRFBs, VO$_2^+$ is the main culprit for aromatic hydrocarbon degradation via oxidation. See D. Chen et al., *RSC Adv.* 2, 8087(2012); and E. J. Park et al., *J. Membr. Sci.* 617, 118565 (2021). Skyllas-Kazacos developed two ex situ membrane durability tests which differed in VO$_2^+$ concentration; 1 and 0.1 M VO$_2^+$ in 5 M total sulfate. See T. Sukkar and M.

Skyllas-Kazacos, *J. Appl. Electrochem.* 34, 137 (2004). Both have advantages and disadvantages: 1 M $VO_2^+$ better mimics actual VRFB concentrations near full charge, but typically quickly degrades sulfonated hydrocarbon polymers. See D. Chen and M. A. Hickner, *Phys. Chem. Chem. Phys.* 15, 11299 (2013). Whereas in 0.1 M $VO_2^+$ faint color changes from yellow to green or blue give clear visual indication of the production of $VO^{2+}$ (due to polymer oxidation), such $VO_2^+$ are rarely experienced (in deep discharge). Durability studies of pendent-sulfonated SDAPP in 0.1 M $VO_2^+$ found that polymer oxidation occurred readily with color indication of $VO^{2+}$ within the first 24 hours and polymer dissolution after 60 days. See C. Fujimoto et al., *Electrochem. Commun.* 20, 48 (2012).

Three separate films (A, B, and C) of S-6PBF-FDAPP were soaked in 1.5 M $VO_2^+$ for 60 days and the IEC and water uptake of the films were contrasted from the initial values. After sixty days of soaking, the films remain unchanged (intact and no discoloration typically observed in oxidation) with no changes to either IEC or water uptake, which are summarized in Table 2. The higher observed stability of S-6PFB-FDAPP over SDAPP is attributed to the presence of electron withdrawing substituents that reduce the electron density and reactivity of the aryl groups from $VO_2^+$ oxidation.

TABLE 2

Change in membrane properties during chemical durability test in 1M $VO_2^+$ solution.

| Films | A | B | C |
|---|---|---|---|
| Weight$_{before}$ (mg) | 75.6 | 76.2 | 57.8 |
| Weight$_{after}$ (mg) | 75.4 | 76.9 | 57.0 |
| Water uptake$_{before}$ % | 24.3 | 27.1 | 26.3 |
| Water uptake$_{after}$ % | 23.8 | 26.6 | 25.9 |
| IEC$_{before}$ meq/g | 1.38 | 1.39 | 1.38 |
| IEC$_{after}$ meq/g | 1.42 | 1.34 | 1.43 |

Vanadium Redox Flow Battery Performance

A single cell with 25 cm² membrane area was used to determine the performance of the membranes in a vanadium redox flow battery. S-6PFB-FDAPP was used in a VRFB to compare with the current state-of-the-art, Nafion-212, due to its excellent physicochemical properties and lower vanadium permeability. The cycling efficiencies of S-6PFB-FDAPP, SS-6PFB-FDAPP, and Nafion-212 membranes as a function of the current density are illustrated in FIGS. 9A-D.

As shown in FIG. 9A, the columbic efficiency (CE) of S-6PFB-FDAPP was close to 100%, significantly higher than SS-6PFB-FDAPP (97.71-99.48%) and Nafion-212 (94.74-97.90%). These results agree with the vanadium permeability shown in Table 1, with S-6PFB-FDAPP an order of magnitude lower than SS-6PFB-FDAPP and two orders of magnitude lower permeability for $VO^{2+}$ than Nafion-212. SS-6PFB-FDAPP and Nafion-212 showed significantly lower CEs particularly at lower current densities (40-80 mA cm$^{-2}$) since the charge/discharge cycles take a longer time to complete, hence, the effects of vanadium ion permeability becomes more evident. At high current density, particularly at 200 mA cm$^{-2}$, the redox reactions between the vanadium species occurs faster than vanadium diffusion, therefore SS-6PFB-FDAPP shows CE of 99.5% and Nafion-212 displays CE of 97.9%.

As shown in FIG. 9C, the voltage efficiency (VE) of all the membranes decrease with increasing current density since VE is directly linked to the ionic conductivity and membrane resistance. At higher current density, the membrane resistance causes higher ohmic polarization, which results in lower VEs. The S-6PFB-FDAPP, SS-6PFB-FDAPP, and Nafion-212 membranes showed ionic conductivity in pure water of 32.9, 51.7, and 103.7 mS cm$^{-1}$, respectively. Nafion-212 showed the highest conductivity but the VE of Nafion-212 is significantly lower than that of the SS-6PFB-FDAPP membrane. Tang and Zawodzinski reported that increasing sulfuric acid concentration (0-18 M) significantly lowers the conductivity of Nafion-117 (0.09 S to 0.01 S cm$^{-1}$) due to "deswelling" of the hydrophilic domain that causes limited sulfuric acid uptake, reduction of water content and lower proton mobility. See Z. Tang et al., *J. Electrochem. Soc.* 161, A1860 (2014). In the same study, pendent functionalized SDAPP also showed a continuous decrease in proton conductivity (0.04-0.01 S cm$^{-1}$) with increasing sulfuric acid concentration, but the loss of proton conductivity was not as large as with Nafion. Tang and Zawodzinski suggested that the smaller change in proton conductivity stems from the rigid backbone (prevents deswelling) and lower Donnan exclusion effect (lower aryl sulfonic acid dissociation) leading to an increase sulfuric acid uptake and uptake of co-ions, such as bisulfate, which may explain the higher VE of SS-6PFB-FDAPP over Nafion-212. See Z. Tang et al., *J. Electrochem. Soc.* 161, A1860 (2014). The S-6PFB-FDAPP, SS-6PFB-FDAPP, and Nafion-212 membranes exhibited 0.58, 0.40, and 0.46 cm² of membrane resistance in single cell, which is in good agreement with the reported VEs of each membrane between 40-200 mA cm$^{-2}$.

Energy efficiency (EE) is the most comprehensive performance index of VRFBs since it includes the parameters associated with coulombic and voltage efficiencies, for example vanadium permeability and membrane resistance. As shown in FIG. 9B, the EEs of S-6PFB-FDAPP, SS-6PFB-FDAPP, and Nafion-212 membranes are 88.9, 92.2 and 85.5% at 40 mA cm$^{-2}$ and 72.8, 78.6 and 73.2% at 200 mA cm$^{-2}$, respectively. The EE of S-6PFB-FDAPP is comparable with Nafion-212 even when S-6PFB-FDAPP possess considerably higher membrane resistance (0.58 vs. 0.46 Ωcm²). This could be attributed to the two order of magnitude lower vanadium ion permeability and significantly higher selectivity towards protons (77.4 vs 1.73). For the same reason, S/SS-6PFB-FDAPP membranes achieved higher discharge capacities at lower current density where contribution from ion selectivity is much higher, i.e. 11.9 Ah L$^{-1}$ (S-6PFB-FDAPP), 11.6 Ah L$^{-1}$ (SS-6PFB-FDAPP) vs. 10.7 Ah L$^{-1}$ (Nafion-212) at 40 mA cm$^{-2}$. The advantage of low ion permeability quickly diminishes with the increase in the current density, as a result Nafion-212 shows comparable discharge capacity at 200 mA cm$^{-2}$, as shown in FIG. 9D.

Long term cycling operation up to 800 cycles were carried out at 80 mA cm$^{-2}$ to demonstrate the utility of pentafluorobenzoyl group functionalized Diels-Alder polyphenylene membranes for VRFBs. As shown in FIG. 10, the S-6PFB-FDAPP, SS-6PFB-FDAPP, SDAPP and Nafion-212 membranes showed a capacity decay rate of 0.052, 0.25, 0.09 and 0.52% per cycle, respectively in first 50 cycles. Nafion-212 membrane loses 80% of capacity in 300 cycles; on the other hand, pendent-sulfonated SDAPP shows good initial capacity retention but quickly degrades (less than 100 cycles) in highly acidic and oxidative VRFB electrolytes. Both pentafluorobenzoyl group functionalized DAPP membranes shows good chemical stability over the cycling period, as indicated by stable CE. However, the SS-6PFB-FDAPP membrane shows higher capacity decay rate than S-6PFB-FDAPP membrane owing to higher vanadium crossover. The S-6PFB-FDAPP membrane lost only ~60% of capacity in 800 cycles corresponding to 0.075% per cycle capacity decay rate, indicating excellent chemical and electrochemical stability under acidic and oxidizing environment.

The sulfonated Diels-Alder poly(phenylene) membranes outperform not only commercial perfluorinated Nafion-212 membranes but also several-sulfonated hydrocarbon membranes reported in the literature, as shown in Table 3. The hybrid inorganic/organic membranes comparison with Nafion or hydrocarbon polymers are avoided as inorganic components may have limited stability or trivial advantage over Nafion in VRFB environments. The synthesized membranes were found to be superior to Nafion-212, not only in terms of vanadium ion permeability ($4.25 \times 10^{-8}$ vs. Nafion-212: $6.0 \times 10^{-6}$ cm$^2$ min$^{-1}$) but also in terms of VRFB performance (CE>99.9% vs. Nafion-212: 94.74-97.90%). In addition, the membrane showed over three times higher capacity retention than Nafion-212 (0.075% vs. 0.25% per cycle) and excellent ex situ and in situ chemical stability. These results corroborate that the S-6PFB-FDAPP membrane is among the best developed for VRFBs thus far.

The present invention has been described as an ion-selective membrane for redox flow batteries. It will be understood that the above description is merely illustrative of the applications of the principles of the present invention, the scope of which is to be determined by the claims viewed in light of the specification. Other variants and modifications of the invention will be apparent to those of skill in the art.

TABLE 3

The comparison of long-term capacity retention, cycling performance and membrane properties with S-6PFB-FDAPP membrane and the previous work.

| | Membrane | Proton conductivity, mS cm$^{-1}$ | Vanadium permeability, cm$^2$ min$^{-1}$ | Capacity retention, % | CE, % (mA cm$^{-2}$) |
|---|---|---|---|---|---|
| 1 | Sulfonated poly(ether ether ketone) | 30.2-38.1 | $6.7 \times 10^{-6}$ –$5.7 \times 10^{-8}$ | — | — |
| 2 | Sulfonated poly(ether ether ketone) | 10.7-11.9 | | — | 92 (40) |
| 3 | Disulfonated poly(arylene ether sulfone) | 23-140 | $1.6 \times 10^{-11}$ –$1.1 \times 10^{-13}$ | — | |
| 4 | Sulfonated Diels Alder poly (phenylene) | 19.8-107.3 | — | — | |
| 5 | Sulfonated sexiphenylene pendent - poly(2,5-benzophenone | 25-82 | $5.2 \times 10^{-7}$ –$4.06 \times 10^{-9}$ | 76.4-95% @ 100 cycles | 100 (50) |
| 6 | Sulfonated polyimide | 15.8-39.5 | $2.45 - 0.99 \times 10^{-7}$ | <80% @ 100 cycles | 98.4 (40) |
| 7 | Sulfonated polybenzimidazole | — | $0.34 \times 10^{-4}$ | 90% @ 23 cycles | 88 (80) |
| 8 | Sulfonated polyimide | 13.1-34.3 | $0.36-3.67 \times 10^{-7}$ | <50% @ 100 cycles | 97 (60) |
| 9 | Sulfonated polysulfone | 13.5-22.2 | $2.94-30 \times 10^{-6}$ | — | 94.9 (50) |
| 10 | Polyfluoro sulfonated polyimide | <40 | $1-7 \times 10^{-7}$ | 61% @ 100 cycles | 94.2 (40) |
| 11 | Sulfonated polyimide | — | $0.04-0.25 \times 10^{-7}$ | 82.6% @ 50 cycles | 98.5 (100) |
| 12 | Sulfonated poly(phenylene sulfide sulfone) | 24-25 | $0.16-1.85 \times 10^{-7}$ | 55% @ 100 cycles | 92.1 (80) |
| 13 | Fluoro sulfonated Diels Alder poly(phenylene) S-6PFB-FDAPP | 32.9 | $4.25 \times 10^{-8}$ | 93.6% @ 100 cycles 40% @ 800 cycles | 99.8 (40) 99.95 (200) |

We claim:

1. An ion-selective membrane for a redox flow battery, comprising a fluoro sulfonated poly(phenylene) having the formula

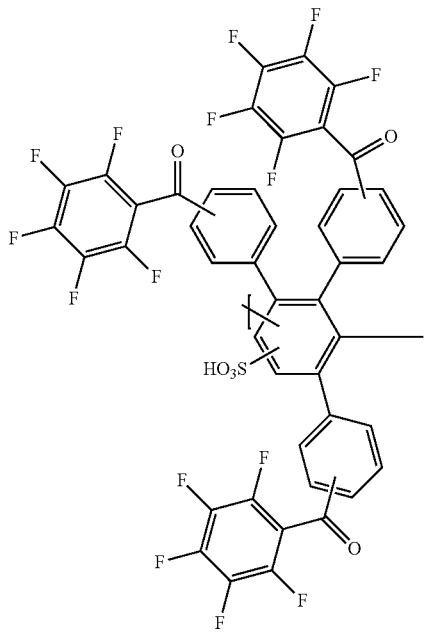

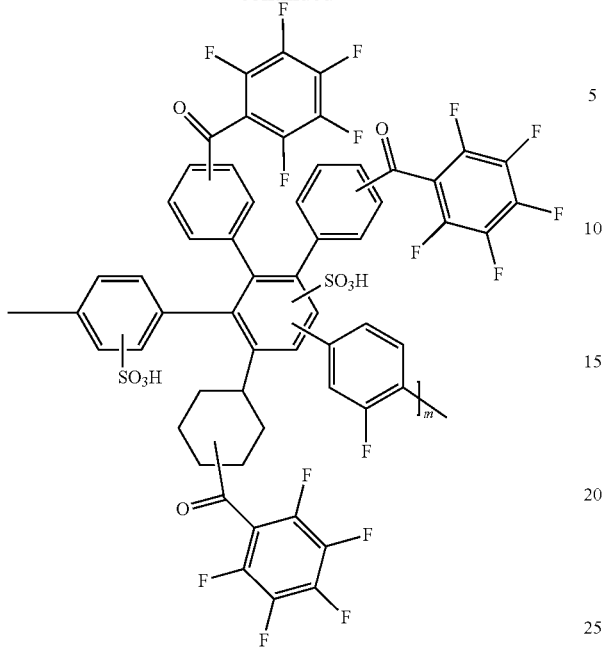
where m is an integer from 1 to 500.
2. An ion-selective membrane for a redox flow battery, comprising a fluoro sulfonated poly(phenylene) having the formula
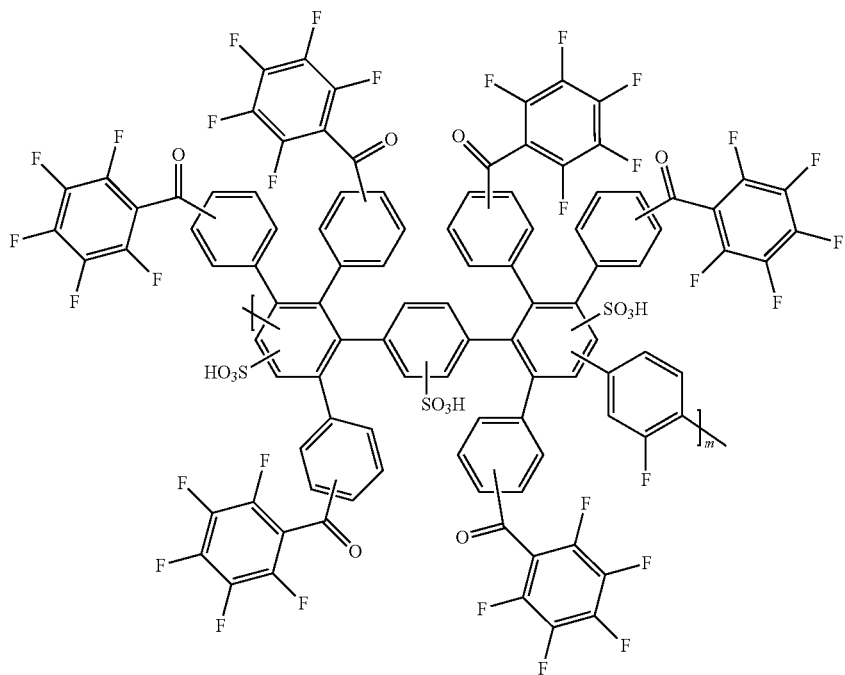
where m is an integer from 1 to 500.
* * * * *